(12) United States Patent
Nakajima

(10) Patent No.: US 12,546,622 B2
(45) Date of Patent: Feb. 10, 2026

(54) FEATURE DATA GENERATION SYSTEM, FEATURE DATABASE UPDATE SYSTEM, AND FEATURE DATA GENERATION METHOD

(71) Applicant: SPATIAL TECHNOLOGY RESEARCH INSTITUTE CO., LTD., Fukuoka (JP)

(72) Inventor: Tsutomu Nakajima, Fukuoka (JP)

(73) Assignee: SPATIAL TECHNOLOGY RESEARCH INSTITUTE CO., LTD., Fukuoka (JP)

( * ) Notice: Subject to any disclaimer, the term of this patent is extended or adjusted under 35 U.S.C. 154(b) by 425 days.

(21) Appl. No.: 18/018,942

(22) PCT Filed: Jan. 12, 2021

(86) PCT No.: PCT/JP2021/000660
§ 371 (c)(1),
(2) Date: Jan. 31, 2023

(87) PCT Pub. No.: WO2022/030033
PCT Pub. Date: Feb. 10, 2022

(65) Prior Publication Data
US 2023/0332917 A1     Oct. 19, 2023

(30) Foreign Application Priority Data
Aug. 3, 2020  (JP) .................................. 2020-131816

(51) Int. Cl.
*G01C 21/00* (2006.01)
*G06T 7/13* (2017.01)
(Continued)

(52) U.S. Cl.
CPC ...... *G01C 21/3811* (2020.08); *G01C 21/3819* (2020.08); *G01C 21/3841* (2020.08);
(Continued)

(58) Field of Classification Search
CPC ............ G01C 21/3811; G01C 21/3841; G01C 21/3819; G01C 21/3848; G01C 21/3804;
(Continued)

(56) References Cited

U.S. PATENT DOCUMENTS 10,816,993 B1 * 10/2020 Tran ..................... G05D 1/0246
11,164,051 B2 * 11/2021 Deegan ..................... G06T 7/33
(Continued)

FOREIGN PATENT DOCUMENTS

CN          118276605 A  *  7/2024  ............. G05D 1/695
EP          4156101 A2   *  3/2023  ............... G06T 7/73
(Continued)

OTHER PUBLICATIONS

Filzmoser; Peter, "Outlier Identification in high dimensions", May 18, 2007, Elsevier (Year: 2007).*
(Continued)

*Primary Examiner* — Aaron W Carter
*Assistant Examiner* — Alejandro Hernandez
(74) *Attorney, Agent, or Firm* — Keating & Bennett, LLP

(57) ABSTRACT

In a feature data generation system, an edge pattern indicating a boundary of a target feature existing around a vehicle is extracted from position data of a large number of measurement points surrounding the vehicle measured using a LIDAR technology, on the basis of image data of surroundings of the vehicle obtained by imaging so as to reduce the amount of information, positions in a terrestrial reference frame are assigned to the extracted edge pattern, and a shape characteristic vector and a feature characteristic vector to be used for generating or updating a feature in a feature database, are generated from the edge pattern to which the positions in the terrestrial reference frame are assigned.

12 Claims, 14 Drawing Sheets

(51) Int. Cl.
G06T 7/521 (2017.01)
G06T 7/73 (2017.01)
(52) U.S. Cl.
CPC .............. *G06T 7/13* (2017.01); *G06T 7/521* (2017.01); *G06T 7/73* (2017.01); *G06T 2207/10028* (2013.01); *G06T 2207/30168* (2013.01); *G06T 2207/30252* (2013.01)
(58) Field of Classification Search
CPC ........ G01C 21/38; G01C 21/30; G01C 21/28; G01C 21/26; G06T 7/521; G06T 7/73; G06T 7/13; G06T 2207/10028; G06T 2207/30168; G06T 2207/30252; G06T 7/74; G06T 17/05; G06T 7/70; G01S 17/88; G01S 17/89; G01S 19/40; G06V 20/58; G06V 20/56; G06V 20/50; G06V 20/588; G06V 20/52; G06V 20/54
See application file for complete search history.

(56) References Cited

U.S. PATENT DOCUMENTS

| | | | | |
|---|---|---|---|---|
| 11,527,085 | B1* | 12/2022 | Widjaja | G06V 10/82 |
| 11,531,354 | B2* | 12/2022 | Tsurumi | G05D 1/0238 |
| 11,629,963 | B2* | 4/2023 | Oh | G05D 1/0274 701/532 |
| 12,384,404 | B2* | 8/2025 | Longman | G01S 17/931 |
| 2006/0210116 | A1* | 9/2006 | Azuma | G06V 10/48 701/1 |
| 2011/0243379 | A1* | 10/2011 | Miyajima | G01C 21/3647 382/103 |
| 2014/0172290 | A1* | 6/2014 | Prokhorov | G01C 21/28 701/408 |
| 2018/0204073 | A1* | 7/2018 | Kawano | B60W 30/12 |
| 2019/0051153 | A1 | 2/2019 | Giurgiu et al. | |
| 2019/0156129 | A1* | 5/2019 | Kakegawa | G08G 1/16 |
| 2019/0212419 | A1* | 7/2019 | Jeong | G01S 17/08 |
| 2019/0244400 | A1* | 8/2019 | Hamer | G01C 21/3844 |
| 2019/0318173 | A1* | 10/2019 | Kristensen | B60W 30/18009 |
| 2020/0026930 | A1* | 1/2020 | Gu | G06V 10/762 |
| 2020/0089971 | A1 | 3/2020 | Li et al. | |
| 2020/0240790 | A1* | 7/2020 | Behrendt | G01S 13/865 |
| 2020/0341466 | A1* | 10/2020 | Pham | G06V 10/454 |
| 2020/0386782 | A1* | 12/2020 | Lee | G01P 21/00 |
| 2021/0323572 | A1* | 10/2021 | He | G06T 3/14 |
| 2022/0180644 | A1* | 6/2022 | Awasthi | G06V 20/588 |
| 2023/0206556 | A1* | 6/2023 | Chong | G06T 7/174 |
| 2024/0310851 | A1* | 9/2024 | Ebrahimi Afrouzi | A47L 9/2873 |
| 2024/0394914 | A1* | 11/2024 | Lee | G06T 7/74 |
| 2025/0078221 | A1* | 3/2025 | Wang | G06T 7/0002 |
| 2025/0137811 | A1* | 5/2025 | Kaku | G06N 3/0464 |
| 2025/0206327 | A1* | 6/2025 | Shaik | G06V 10/56 |

FOREIGN PATENT DOCUMENTS

| | | |
|---|---|---|
| JP | 2002-074323 A | 3/2002 |
| JP | 2017-174197 A | 9/2017 |
| JP | 2019-049466 A | 3/2019 |
| JP | 2020-047276 A | 3/2020 |

OTHER PUBLICATIONS

Jo; Kichun et al. "Precise Localization of an Autonomous Car Based on Probabilistic Noise Models of Road Surface Marker Features Using Multiple Cameras", Jul. 2025, IEEE (Year: 2025).*
Official Communication issued in corresponding European Patent Application No. 21853512.8, mailed on Jun. 10, 2024, 9 pages.
Pannen et al., "HD Map Change Detection with a Boosted Particle Filter", 2019 International Conference on Robotics and Automation (ICRA), IEEE, May 20-24, 2019, pp. 2561-2567.
Jo et al., "Simultaneous Localization and Map Change Update for the High Definition Map-Based Autonomous Driving Car", Sensors, vol. 18, Sep. 18, 2018, pp. 1-16.
Official Communication issued in International Patent Application No. PCT/JP2021/000660, mailed on Mar. 9, 2021.

* cited by examiner

FIG. 11

```
FEATURE CHARACTERISTIC VECTOR

Feature_Type: Road Edge
    Lane_ID : $L_{102}$
    Waypoint_ID : $W_{1015}-W_{1029}$
    Absolute_Position : Latitude, Longitude, Hight
    Edge_Pattern
    Bounding_Rectangle
    Center_of_Rectangle
    Vixel
    Static_data
    Number_of_Input
    Time_Stamp
    Sliding_Window
    Quality_Index
    Histogram
    SD_Map_Tile_Number
    ......
```

Variance_Value:Large
Time_Stamp:05/26/2018
Quality_Index:2

Variance_Value:Small
Time_Stamp:07/05/2020
Quality_Index:5

FEATURE DATA GENERATION SYSTEM, FEATURE DATABASE UPDATE SYSTEM, AND FEATURE DATA GENERATION METHOD

TECHNICAL FIELD

The present invention relates to a feature data generation system, a feature database update system, and a feature data generation method used for updating and generating a three-dimensional high-precision map.

BACKGROUND ART

As moving body driving environment description data used for advanced driving assistance systems (ADAS) and autonomous driving (AD), there is known a three-dimensional high-precision map, which is a spatial map in which lanes, guard rails, road signs, crosswalks, and the like on roads are recorded at more accurate positions than in conventional planar maps, and there is also known a feature database that provides feature data to the three-dimensional high-precision map.

In addition, utilizing a high precision positioning service of the quasi-zenith satellite system "Michibiki" which has started to be provided in recent years which makes it possible to reduce an error in the detected position of a moving body down to several centimeters. It is expected to perform more accurate autonomous driving by using this high-precision positioning service and the three-dimensional high-precision map in combination.

In order to create a three-dimensional high-precision map, it is necessary to collect data of road edges, lanes, guard rails, road signs, and crosswalks to be target objects (hereinafter, referred to as "feature data") in advance in a feature database. As a method of collecting such feature data, there has been proposed a method by which a camera mounted on a moving body such as an automobile captures an image of its surroundings and the obtained image is analyzed to acquire feature data.

For example, in the system proposed by Mobileye Corporation, feature data is acquired by using a monocular camera to grasp the situation of surroundings of a moving body. However, since the monocular camera cannot achieve sufficient ranging accuracy, it is difficult to acquire high-precision feature data that is worth constituting a three-dimensional high-precision map.

In addition, there has been proposed a system that acquires feature data by using a compound-eye camera to grasp the situation of surroundings of a moving body. However, the system is higher in cost than a system with a monocular camera. In addition, since the system performs ranging by triangulation based on positions of a plurality of cameras, it is necessary to calibrate the positions of the cameras. Further, the camera has a disadvantage that it is vulnerable to environmental changes such as rain, fog, and sunset. In the case of using compound-eye cameras, it is necessary to repeatedly perform triangulation calculation on the basis of a plurality of images obtained from the cameras during movement of the moving body. This requires an enormous amount of calculation, and it is not realistic to use compound-eye cameras as a tool for acquiring feature data.

There has also been proposed a method of sequentially collecting feature data around a vehicle by driving a vehicle equipped with a measurement system called mobile mapping system (MMS) equipped with three-dimensional measuring instruments such as a camera and a laser scanner and a satellite positioning device such as a GPS (see Patent Literature 1, for example). A laser imaging detection and ranging (LIDAR) technology, which is a remote sensing technology using laser light, is applied to the laser scanner.

The use of the LIDAR technology makes it possible to acquire position data of an accurate distance to a measurement point using laser light without performing triangulation calculation. Due to the use of an extremely short wavelength, the LIDAR technology enables identification and detection of smaller features than those addressed by a RADAR technology using radio waves. In the LIDAR technology, the calibration of camera positions is unnecessary and no image is used unlike in the case of using compound-eye cameras. Therefore, the LIDAR technology is unlikely to be affected by environmental changes such as rain and fog. Therefore, the application of a laser scanner using the LIDAR technology to the measurement system makes it possible to easily acquire more accurate feature data than in the case of using compound-eye cameras.

CITATION LIST

Patent Literature

Patent Literature 1: Japanese Laid-Open Patent Publication (kokai) No. 2019-049466

SUMMARY OF INVENTION

Technical Problems

However, since the laser scanner of the MMS acquires the position data of all the measurement points surrounding the vehicle, it is necessary to process an enormous amount of position data in order to acquire the feature data by the MMS, which takes a lot of labor and time. Therefore, after the feature data of a certain region is acquired, the feature data of the region is hardly re-acquired thereafter. Accordingly, even if the corresponding feature, for example, a road sign is moved due to construction or the like, the movement of the corresponding feature is not reflected in the feature database.

If there exists any obstacle such as a vehicle parked on a roadside in a region, the region may be hidden by the obstacle and become unmeasurable. Furthermore, since the conventional laser scanner executes scanning by mechanical rotation at regular time intervals, some target object may fall between adjacent laser light, so that the target object may not be irradiated with the laser light and may not be recognized as a feature. Therefore, the features obtained by the laser scanner of the MMS are not necessarily accurate.

In order to acquire the feature data from the position data of the measurement points indicating the situation of surroundings of the vehicle, for example, the operator determines whether the aggregate of the position data represents the features. Then, the polygon data and spline curve data of the aggregate determined to represent features are acquired as feature data. At this time, artificial errors such as the operator's determination mistakes may be reflected in the feature data. However, since the feature data is hardly re-acquired as described above, there is no opportunity to correct the feature data including the mistakes in the feature database.

That is, even if the feature database is created using the MMS, it is difficult to continue ensuring the accuracy of the feature database and a three-dimensional high-precision map updated or generated using the feature database.

An object of the present invention is to provide a feature data generation system, a feature database update system, and a feature data generation method capable of securing the accuracy of a three-dimensional high-precision map.

Solution to Problem

In order to achieve the above object, a feature data generation system of the present invention includes: an edge pattern extraction unit extracts an edge pattern indicating a boundary of a target feature existing around a moving body from position data of a large number of measurement points around the moving body and to delete unnecessary position data of the measurement points, the measurement points being measured using a LIDAR technology; a terrestrial reference frame position assignment unit assigns positions in a terrestrial reference frame to the extracted edge pattern; and a feature data generation unit configured to generate feature data representing a feature from the edge pattern to which the positions in the terrestrial reference frame are assigned.

Advantageous Effects of Invention

According to the present invention, it is possible to secure the accuracy of a three-dimensional high-precision map.

BRIEF DESCRIPTION OF DRAWINGS

FIG. 11 is a diagram illustrating an example of feature characteristic vectors generated by a feature characteristic vector database generation unit.

DESCRIPTION OF EMBODIMENTS

Hereinafter, an embodiment of the present invention will be described with reference to the drawings.

Figure 1:
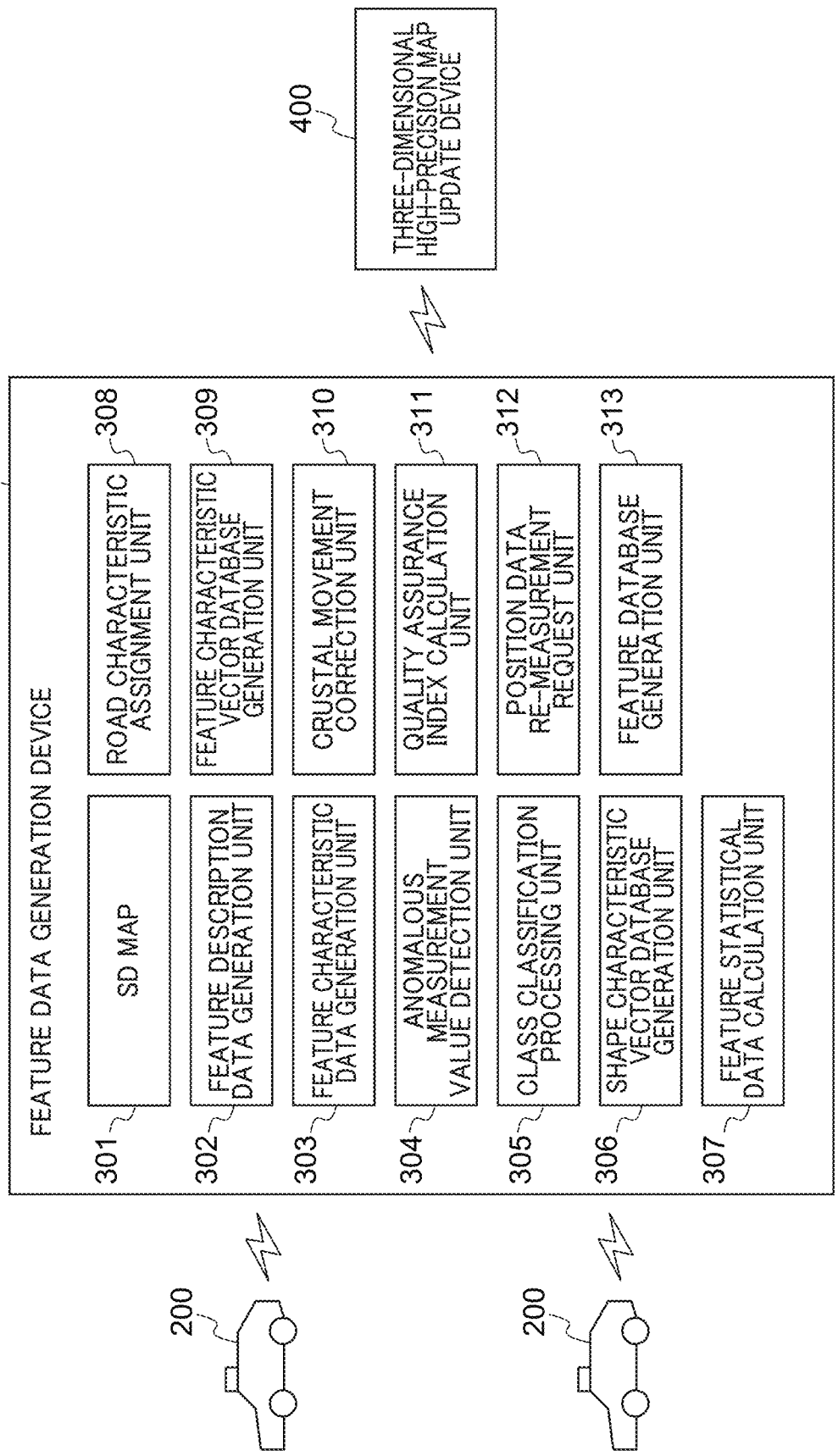
FIG. 1 is a block diagram schematically illustrating a configuration of a feature data generation system according to an embodiment of the present invention.

FIG. 1 is a block diagram schematically illustrating a configuration of a feature data generation system (feature database update system) according to an embodiment of the present invention. Referring to FIG. 1, a feature data generation system 100 includes at least one vehicle 200 (moving object), a feature data generation device 300 including a host computer, for example, and a three-dimensional high-precision map update device 400. The vehicle 200, the feature data generation device 300, and the three-dimensional high-precision map update device 400 can transmit and receive data to and from each other in a wireless or wired manner. The feature data generation device 300 and the three-dimensional high-precision map update device 400 may exist on a cloud as cloud servers.

The feature data generation device 300 includes an SD map 301 (standard accuracy map), a feature description data generation unit 302, a feature characteristic data generation unit 303, an anomalous measurement value detection unit 304, a class classification processing unit 305, a shape characteristic vector database generation unit 306, a feature statistical data calculation unit 307, a road characteristic assignment unit 308, a feature characteristic vector database generation unit 309, a crustal movement correction unit 310, a quality assurance index calculation unit 311, a position data re-measurement request unit 312, and a feature database generation unit 313. Each component of the feature data generation device 300 will be described later in detail. The feature description data generation unit 302, the feature characteristic data generation unit 303, the shape characteristic vector database generation unit 306, and the feature characteristic vector database generation unit 309 correspond to a feature data generation unit.

The three-dimensional high-precision map update device 400 stores a three-dimensional high-precision map (not illustrated), and generates and updates features of the three-dimensional high-precision map using the feature data generated by the feature data generation device 300. The three-dimensional high-precision map update device 400 may be integrated with the feature data generation device 300, and the integrated feature data generation device 300 may generate and update the features of the three-dimensional high-precision map using the feature data generated by itself.

Figure 2:
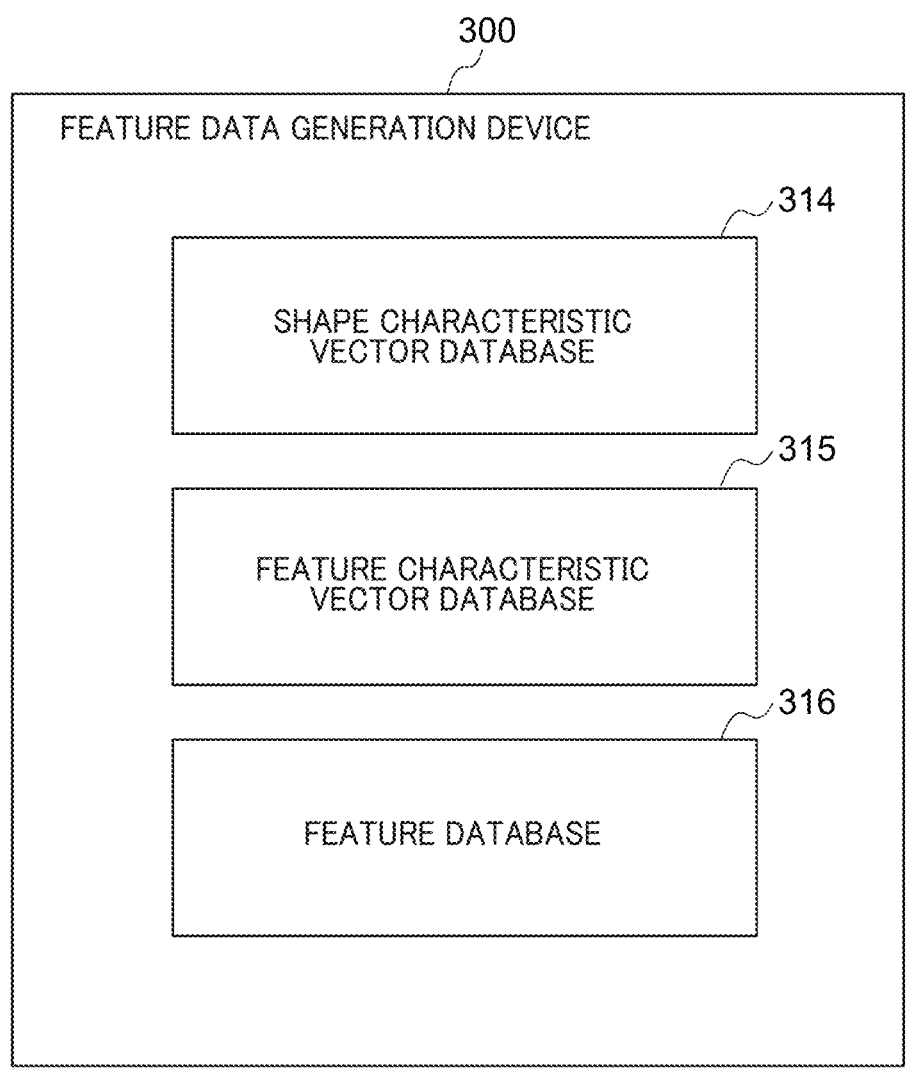
FIG. 2 is a diagram for describing a database configuration of a feature data generation device illustrated in FIG. 1.

FIG. 2 is a diagram for describing a database configuration of the feature data generation device 300 illustrated in FIG. 1. Referring to FIG. 2, the feature data generation device 300 includes a shape characteristic vector database 314, a feature characteristic vector database 315, and a feature database 316. The shape characteristic vector database 314 stores the shape characteristic vectors generated by the feature characteristic data generation unit 303 and the shape characteristic vector database generation unit 306. The feature characteristic vector database 315 and the feature database 316 store the feature characteristic vectors generated by the feature characteristic vector database generation unit 309. Each database in the feature data generation device 300 will be described later in detail.

FIG. 3 is a diagram for describing a configuration and functions of the vehicle 200 illustrated in FIG. 1. In the feature data generation system 100 of FIG. 1, there are a plurality of vehicles 200. Since all of them have the same configuration, one vehicle 200 will be described here. The vehicle 200 is not limited to an automobile, and corresponds to a two-wheeled vehicle or a flying object (such as a drone), for example.

Figure 3A:
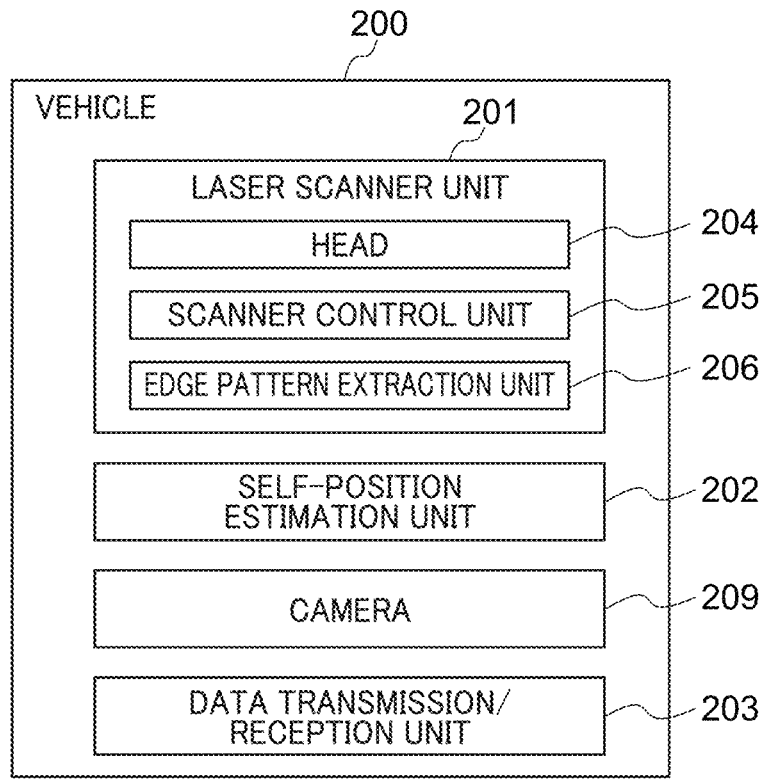
FIG. 3A is a diagram for describing a configuration and functions of a vehicle illustrated in FIG. 1.

The vehicle 200 includes a laser scanner unit 201 using the LIDAR technology, a self-position estimation unit 202 (absolute coordinate system position assignment unit), a data transmission/reception unit 203, and a camera 209. The laser scanner unit 201 includes a head 204, a scanner control unit 205, and an edge pattern extraction unit 206 (FIG. 3A).

Figure 3B:
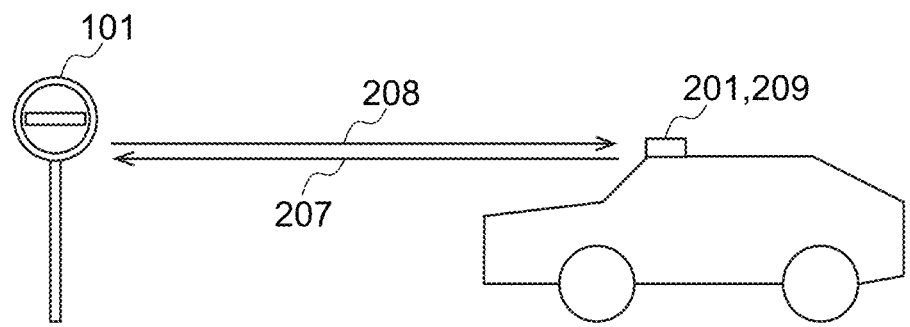
FIG. 3B is a diagram for describing a configuration and functions of the vehicle illustrated in FIG. 1.

As illustrated in FIG. 3B, for example, the laser scanner unit 201 irradiates the surroundings of the own vehicle including a road sign 101 with a laser light 207 from the head 204 and receives reflected light 208 from a large number of measurement points in the periphery, thereby acquiring the distance, orientation, and elevation angle of each measurement point on the scanner reference coordinate system as position data. Since the acquisition of the position data is continued while traveling of the vehicle 200, the laser scanner unit 201 acquires position data in a wide range as a group (point group) of enormous amount of point data as the vehicle 200 travels.

Figure 3C:
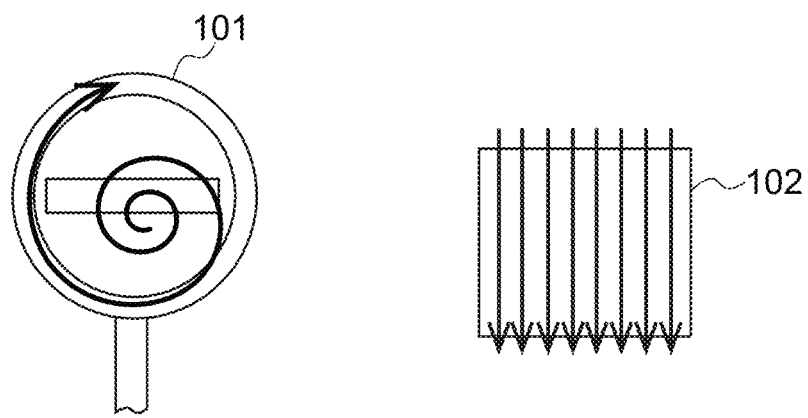
FIG. 3C is a diagram for describing a configuration and functions of the vehicle illustrated in FIG. 1.

The head 204 has a laser light irradiation direction variable device, for example, a micro electro mechanical systems (MEMS) device, and performs scanning of the surroundings of the vehicle 200 by the laser light 207. The scanner control unit 205 controls the head 204 by software to realize various scan patterns of the laser light 207. In particular, the scanner control unit 205 intensively irradiates a feature with the laser light 207 to acquire a large number of position data from the feature and its surroundings. There are several types of scan patterns for intensively irradiating a feature with the laser light 207. For example, conical scanning is performed on the road sign 101 whose tip has a circular plate so as to draw a spiral by the laser light 207 (FIG. 3C). In addition, vertical scanning is performed on a target object 102 fixed to the ground, such that scanning in the vertical direction by the laser light 207 is repeated while being gradually shifted in the horizontal direction (FIG. 3C). As a result, it is possible to efficiently obtain a large number of position data from the feature and its surroundings, and to improve the accuracy of the generated feature data. In addition, since a large number of unnecessary position data are not acquired from a surrounding region having no extra value other than the feature, the generation efficiency of the feature data can be improved.

The scanner control unit 205 intensively irradiates a feature recognized in surrounding image data captured by the camera 209 mounted on the vehicle 200, with the laser light 207. In order to smoothly perform integration (fusion) of image data and position data to be described later, the laser light 207 may be intensively applied to the feature confirmed in the surrounding image data captured by the mounted camera 209 to increase the position data of the feature as described above, or the feature confirmed in the position data acquired by the laser light 207 may be intensively imaged by the camera 209 to improve the accuracy of the image data of the feature. In addition, the feature data generation device 300 may transmit the outline position information of the feature included in the SD map 301 to the vehicle 200, and perform queuing measurement by intensively applying the laser light 207 to a portion corresponding to the position information of the feature received by the scanner control unit 205 of the laser scanner unit 201. Furthermore, at night or in rainy weather, the irradiation density of the laser light 207 may be set higher than that in the daytime.

The scan patterns realized by the scanner control unit 205 are not limited to those the above-described conical scan and vertical scan. For example, the scanner control unit 205 can also realize a pattern that swirls in a rectangular shape or perform horizontal scan in which scanning in the horizontal direction is repeated with a gradual shift in the vertical direction.

Figure 4A:
FIG. 4A is a diagram for describing extraction of an edge pattern by a laser scanner unit.
Figure 4B:
FIG. 4B is a diagram for describing extraction of the edge pattern by the laser scanner unit.
Figure 4C:
FIG. 4C is a diagram for describing extraction of the edge pattern by the laser scanner unit.

The edge pattern extraction unit 206 extracts, as an edge pattern, an aggregate of position data along the contour line or line segment shape of a target feature with reference to the density of position data surrounding the vehicle 200 and the reflection intensity of the laser light 207. An example of the method of extracting an edge pattern is a method of extracting an edge pattern (FIG. 4C) indicating the shape boundary (edge) of a target feature existing surrounding the vehicle 200 by integrating (fusing) image data (FIG. 4A) of the surroundings of the vehicle 200 captured by the camera 209 and a large number of position data (FIG. 4B) of the surroundings of the vehicle 200 obtained by scanning with the laser light 207, as described in the website of AEYE, which is an applicant of U.S. Pat. No. 10,495,757. The method of extracting an edge pattern is not limited to the fusion of image data and position data. The edge pattern may be extracted from the position data alone without using the image data. The target feature here corresponds to any of road structures such as guardrails and road edges (including curbstones), road edges, painted marks such as white lines, marker poles (including road signs and traffic lights), and target objects near roads such as buildings.

Therefore, in the present embodiment, the edge pattern is an aggregate of significant position data representing the contour of the target feature. The extraction of the edge pattern greatly reduces unnecessary position data, so that the position data of a target feature alone that is a candidate for a feature can be extracted. As a result, the load of subsequent processing can be greatly reduced.

The self-position estimation unit 202 includes an inertial measurement unit including a gyro and an accelerometer, or an odometry, for example. The self-position estimation unit 202 acquires a posture expressed by a roll angle, a pitch angle, and a yaw angle of the vehicle 200, a position of the vehicle 200, and a parallel movement amount and a movement trajectory on a horizontal plane with high precision, in a terrestrial reference frame (hereinafter, referred to as "absolute coordinate system") by using high-precision positioning, for example, global navigation satellite system (GNSS) single positioning, or GNSS interference positioning such as precise point positioning-real time kinematic (PPP-RTK). Furthermore, based on the acquired position of the vehicle 200 on the absolute coordinate system, the self-position estimation unit 202 performs coordinate-conversion on the position of each position data constituting the edge pattern on the scanner reference coordinate system into a position (hereinafter, referred to as "absolute coordinate position") on the absolute coordinate system, and assigns an absolute coordinate position to each position data. A satellite positioning receiver signal of the vehicle 200 may be transmitted to the feature data generation device 300, the feature data generation device 300 may increase the accuracy of the satellite positioning receiver signal and assign an absolute coordinate position to each position data.

The self-position estimation unit 202 may estimate the absolute coordinate position of the vehicle 200 by triangulation using various reference points (for example, Ground Control Points (GCPs)) prepared in the vehicle 200 in advance in a satellite invisible environment where GNSS cannot be used. At this time, when the vehicle 200 traveling in the tunnel recognizes the blower, the position information on the design drawing of the blower may be used as a reference point. The self-position estimation unit 202 may upload measurement information necessary for calculating the absolute coordinate position of the vehicle 200 to a server (not illustrated) of the vehicle 200, so that the server may estimate the absolute coordinate position of the vehicle 200 by using signal information of a GNSS receiver (not illustrated) mounted on the vehicle 200.

In the present embodiment, the coordinate conversion of each position data from the position on the scanner reference coordinate system to the absolute coordinate position is performed after the extraction of the edge pattern. Alternatively, the position information of all the position data may be converted to the absolute coordinate positions before the extraction of the edge pattern. However, since the former has a smaller number of objects to be subjected to coordinate transformation, the former is preferable from the viewpoint of improving work efficiency.

The data transmission/reception unit 203 transmits the edge pattern in which the absolute coordinate position is assigned to each position data to the feature data generation device 300, and also receives an instruction for searching (scanning) a feature, for example, a re-scanning execution request described later.

In principle, the SD map 301 of the feature data generation device 300 is a two-dimensional map that has a smaller amount of information than a three-dimensional high-precision map, but includes position information and shape information of features serving as guides in route search, for example. As described above, the position information of the feature is provided to the laser scanner unit 201 (the scanner control unit 205) of the vehicle 200, and the shape information of the feature is used by the class classification processing unit 305 as described later.

The feature description data generation unit 302 describes the edge pattern transmitted from the data transmission/reception unit 203 with a multidimensional vector and generates feature description data of the target feature.

The edge pattern here may include measurement noise, and some position data may be missing. Therefore, the feature description data generation unit 302 distinguishes between features having a shape such as a circle or a polygon typified by marker poles and features long to both ends typified by paint marks such as white lines, guardrails or road edges (hereinafter, referred to as "linear features"), and changes the description method by a multidimensional vector between them.

Figure 5A:
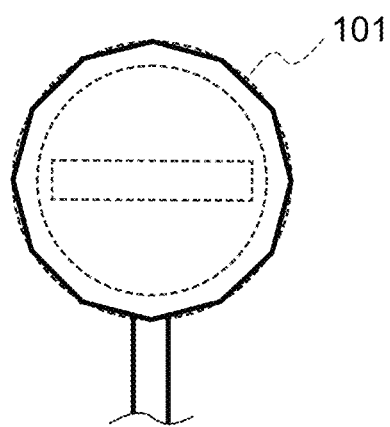
FIG. 5A is a diagram for describing generation of feature description data by a feature description data generation unit.
Figure 5B:
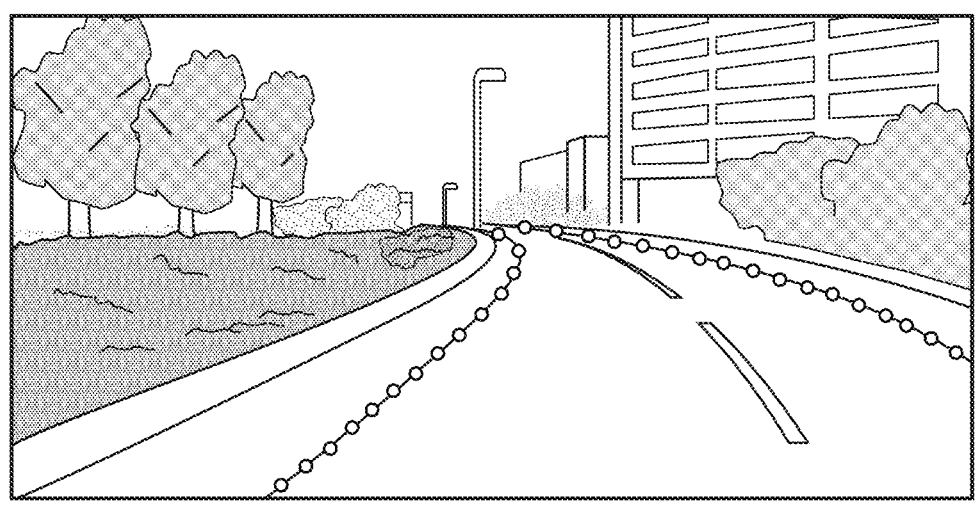
FIG. 5B is a diagram for describing generation of feature description data by the feature description data generation unit.

For example, as illustrated in FIG. 5A, a polygon from the road sign 101 is extracted, and feature description data is generated by using each point coordinate or centroid point of a rectangle in contact with the extracted polygon as a vector element together with various types of information of the edge pattern. The barycentric point of the rectangle surrounding the road sign 101 may be used as a vector element. As illustrated in FIG. 5B, the feature description data generation unit 302 generates the feature description data from the road edges (see the discrete white points in the drawing) using the position information of each position data of the edge pattern as a vector element. Since the surface property of the target feature can also be known according to the reflection intensity of the laser light 207, the reflection intensity may be set as a vector element that is an index of the surface property.

The feature characteristic data generation unit 303 (matching unit) performs matching between feature description data of a feature already registered and prepared in the feature database 316 (hereinafter, referred to as "existing feature description data") and feature description data generated by the feature description data generation unit 302 (hereinafter, referred to as "new feature description data"), for example.

Specifically, the feature characteristic data generation unit 303 reads the existing feature description data of a feature in a region where the new feature description data exists from the feature database 316, compares the information on an absolute coordinate position of the new feature description data with the information on an absolute coordinate position of the existing feature description data. If there is a match between these pieces of information at a predetermined ratio or more, the feature characteristic data generation unit 303 sets the new feature description data as a shape characteristic vector for updating the existing feature description data (hereinafter, also referred to as "updating shape characteristic vector"). On the other hand, if there is no match between the information of the absolute coordinate position of the new feature description data and the information of the absolute coordinate position of the existing feature description data at a predetermined ratio or more, the feature characteristic data generation unit 303 sets the new feature description data as a shape characteristic vector for generating new feature data (hereinafter, also referred to as "generating shape characteristic vector"). In addition, the feature characteristic data generation unit 303 stores the set shape characteristic vectors in the shape characteristic vector database 314.

Figure 6A:
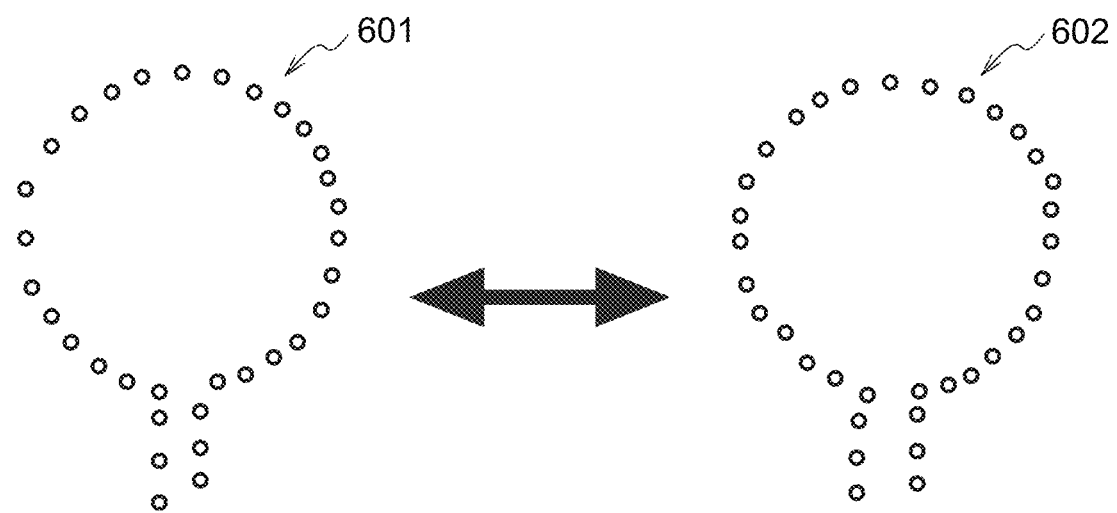
FIG. 6A is a diagram for describing matching of feature description data by the feature description data generation unit.
Figure 6B:
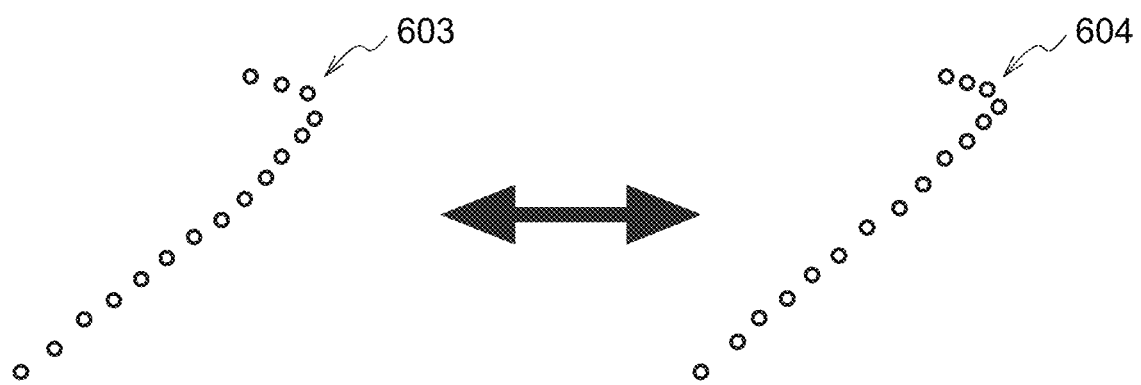
FIG. 6B is a diagram for describing matching of feature description data by the feature description data generation unit.

FIGS. 6A and 6B are conceptual diagrams of matching between new feature description data and existing feature description data. FIG. 6A illustrates matching between new feature description data 601 representing a road sign and existing feature description data 602. FIG. 6B illustrates matching between new feature description data 603 representing road edges and existing feature description data 604.

In the present embodiment, edge patterns are sequentially transmitted from the plurality of vehicles 200 to the feature data generation device 300, and generation of the feature description data and storing the shape characteristic vectors in the shape characteristic vector database 314 are repeated. Therefore, a large number of updating shape characteristic vector the same existing feature description data and shape characteristic vectors for generating the same features are stored in the shape characteristic vector database 314.

Incidentally, the shape characteristic vectors stored in this way may include anomalous values caused by measurement noise or the like. If the shape characteristic vectors including such anomalous values are used, accurate feature data cannot be obtained.

Correspondingly, the anomalous measurement value detection unit 304 removes anomalous values from the shape characteristic vectors. Specifically, the anomalous measurement value detection unit 304 detects and removes anomalous values from each shape characteristic vector using a Mahalanobis' generalized distance. The Mahalanobis' generalized distance is a distance in a multidimensional space in consideration of the variance of a plurality of data. In this case, the anomalous measurement value detection unit 304 removes position data having a long Mahalanobis' generalized distance from the center of variance of the position data constituting shape characteristic vectors that are multidimensional vectors.

Figure 7:
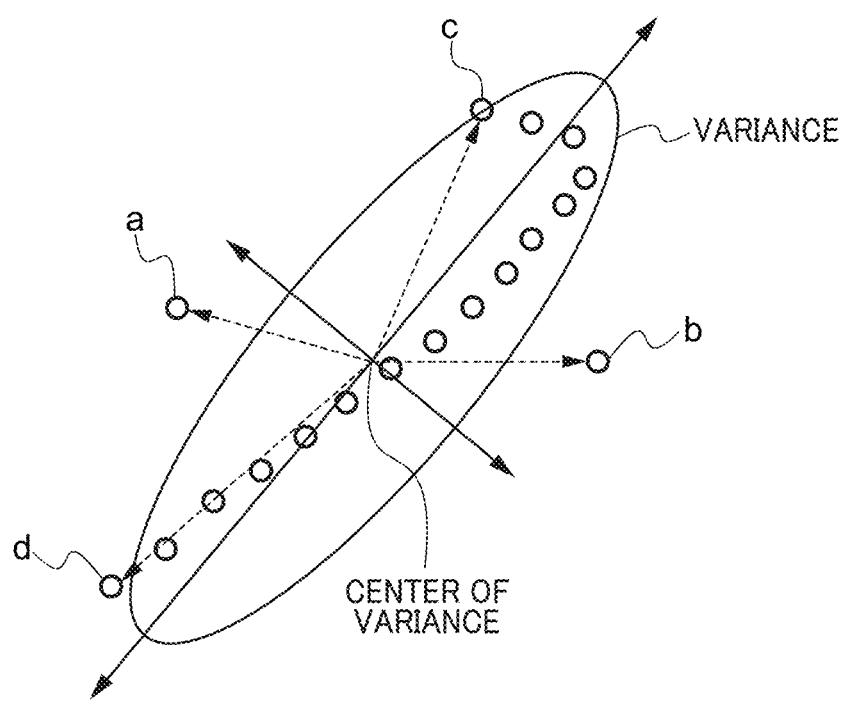
FIG. 7 is a diagram for describing a concept of a Mahalanobis' generalized distance.

For example, in FIG. 7 that is represented in two dimensions for easy understanding, position data a and b appear to be closer to the center of variance than position data c and d. However, in consideration given to the form of the variance, the Mahalanobis' generalized distances of the position data a and b are longer than the Mahalanobis' generalized distances of the position data c and d. Therefore, in this case, the position data a and b are removed as anomalous values.

In addition, since the scannable range of the laser scanner unit 201 by the laser light 207 may change according to the traveling state and the surrounding situation of the vehicle 200, the edge pattern extracted by the edge pattern extraction unit 206 of the laser scanner unit 201 may not include the entire position data of the feature. In this case, it is necessary to specify which feature the edge pattern corresponds to.

Figure 8A:
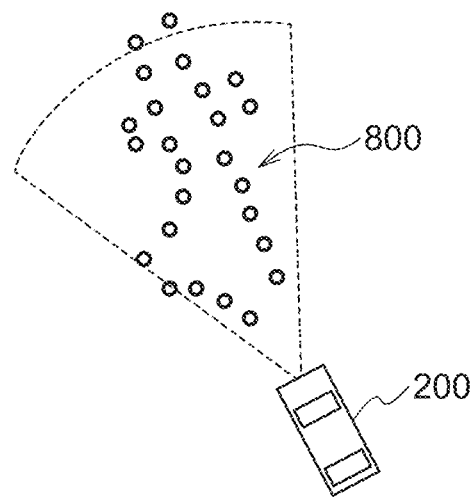
FIG. 8A is a diagram for describing corresponding feature determination by a class classification processing unit.
Figure 8B:
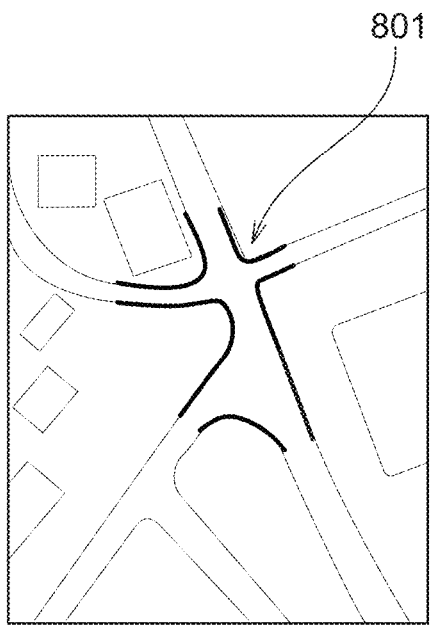
FIG. 8B is a diagram for describing corresponding feature determination by the class classification processing unit.
Figure 8C:
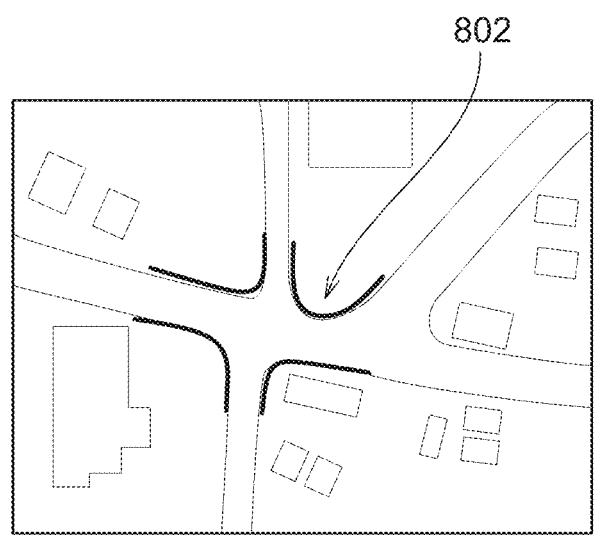
FIG. 8C is a diagram for describing corresponding feature determination by the class classification processing unit.

Correspondingly, the class classification processing unit 305 determines to which feature the edge pattern corresponds. Specifically, the class classification processing unit 305 compares the edge pattern transmitted from the data transmission/reception unit 203 with the shape information of the feature in the region where the edge pattern stored in the SD map 301 exists. In the cases of FIGS. 8A to 8C, it can be seen that an edge pattern 800 (FIG. 8A) corresponds to a part of a deformed five-forked road 801 that is a feature (FIG. 8B) and does not correspond to a four-forked road 802 that is also a feature (FIG. 8C). In this case, the class classification processing unit 305 determines that the edge pattern 800 corresponds to the deformed five-forked road, and classifies (the shape characteristic vector corresponding to) the edge pattern 800 into a class of deformed five-forked road. Since it is difficult to accurately compare the edge pattern with a feature unless there is a match between the azimuth of the edge pattern and the azimuth of the feature, it is preferable to compare the edge pattern with the feature after correcting the azimuth of the edge pattern so as to match the azimuth of the feature in consideration of the position and posture of the vehicle 200.

Comparing such an edge pattern with a part of a feature stored in the SD map 301 allows the vehicle 200 to recognize the own vehicle position in the SD map 301 and recognize nearby features to be reference points of the autonomous driving. Therefore, even without a three-dimensional high-precision map, the vehicle 200 can perform accurate self-position estimation and recognition of the surrounding environment as long as it includes the SD map, the laser scanner unit 201, and the camera 209. Thus, the 200 is capable of safe driving support and autonomous driving.

The shape characteristic vector database generation unit 306 manages a large number of shape characteristic vectors stored in the shape characteristic vector database 314. For example, the shape characteristic vector database generation unit 306 manages a plurality of updating shape characteristic vectors corresponding to the same existing feature description data in association with each other, and uses these updating shape characteristic vectors to update the shape characteristic vectors corresponding to the existing feature description data.

The timing for updating the shape characteristic vectors may be when the number of updating shape characteristic vector corresponding to the same existing feature description data exceeds a predetermined number. In this case, a method using the idea of a sliding window may be adopted, for example. Specifically, the shape characteristic vectors may be updated when the number of updating shape characteristic vectors (corresponding to the area of the sliding window) accumulated over time reaches a predetermined number. At this time, since the number of updating shape characteristic vectors will reach the predetermined number in a relatively short time in a region with a large traffic volume, the shape characteristic vectors corresponding to the existing feature description data of the features are updated in short cycles. On the other hand, in a region with a small traffic volume, it will take a relatively long time for the number of updating shape characteristic vectors to reach the predetermined number, the shape characteristic vectors corresponding to the existing feature description data of the features are updated in long cycles. That is, the update cycles (frequency) of the shape characteristic vectors may depend on the traffic volume of the region where the features exist. This optimizes the update cycles of the shape characteristic vectors, and optimizes the calculation load of the shape characteristic vector database generation unit 306. Furthermore, the timing for updating the shape characteristic vectors may be when a predetermined time has elapsed since the updating shape characteristic vectors were first stored.

The timing for updating the shape characteristic vectors is not limited to these timings, and may be when a predetermined time has elapsed from the completion of a construction in the corresponding region according to publicly provided construction information described later, or when a predetermined time has elapsed from a time at which the shape characteristic vectors have temporally changed, which is specified by statistical values of the shape characteristic vectors as described later, for example.

The method of updating shape characteristic vectors differs depending on the type of features corresponding to the existing feature description data. For example, in a case where the feature corresponding to the existing feature description data is a feature having a shape such as a circle or a polygon represented by a marker pole, the shape characteristic vector database generation unit 306 obtains the existing feature description data accumulated in the shape characteristic vector database 314 and an average value of coordinates of each point or centroid point of a rectangle in contact with the polygon in each update shape characteristic vector, for example, and updates the shape characteristic vectors corresponding to the feature using the average value.

In addition, in a case where a predetermined number or more of the generating shape characteristic vectors are stored in the shape characteristic vector database 314, the shape characteristic vector database generation unit 306 generates a new shape characteristic vector by using the coordinates of the respective points of the rectangle in contact with the polygon and the average value of the centroid points as described above if the feature corresponding to generating feature description data is a feature represented by a marker pole.

Incidentally, when shape characteristic vectors are stored in the shape characteristic vector database 314, the extending shape of road edges or the traffic classification of a road may be changed or a marker pole may be moved due to a road construction or the like. In this case, the vector elements of the shape characteristic vectors will greatly change before and after the road construction. Thus, if the shape characteristic vectors before and after the road construction are collected and then subjected to statistical processing to update or regenerate shape characteristic vectors, the obtained feature data may become inaccurate.

Figure 9A:
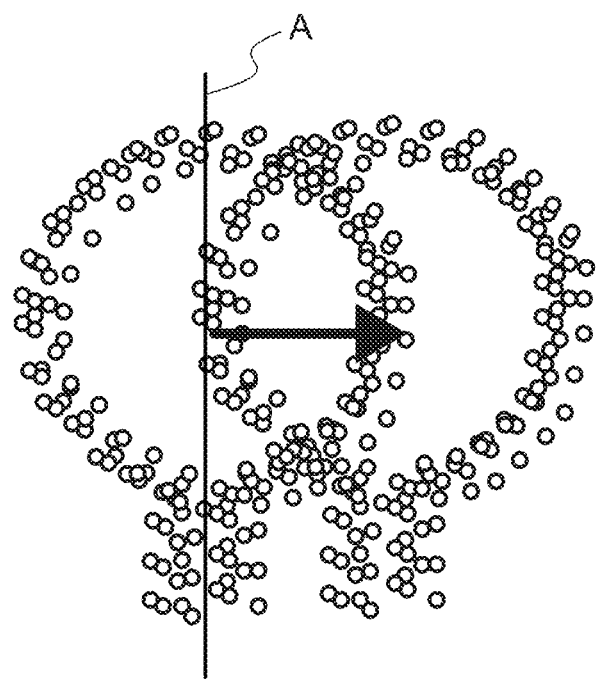
FIG. 9A is a diagram for describing determination of a temporal change in a shape characteristic vector by a feature statistical data calculation unit.
Figure 9B:
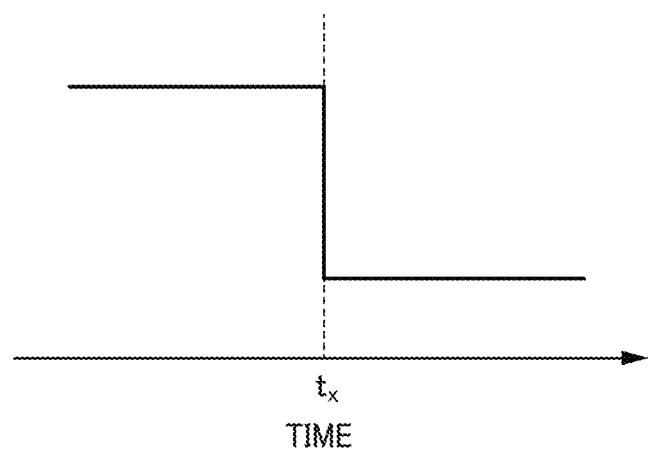
FIG. 9B is a diagram for describing determination of the temporal change in the shape characteristic vector by the feature statistical data calculation unit.

Correspondingly, the feature statistical data calculation unit 307 calculates the statistical values of the shape characteristic vectors stored in the shape characteristic vector database 314, and determines whether each shape characteristic vector includes a temporal change. For example, as illustrated in FIG. 9A, when the road sign is moved at time $t_x$, the moving average value of the number of pieces of position data present on the line A of the shape characteristic vectors corresponding to the road sign changes at the time $t_x$ (FIG. 9B). In this case, the feature statistical data calculation unit 307 determines that the road sign has been moved at the time $t_x$, and does not use the shape characteristic vectors stored before the time $t_x$ in subsequent processing. The shape characteristic vector database generation unit 306 updates the shape characteristic vectors corresponding to the existing feature description data using the shape characteristic vectors stored after the time $t_x$.

The statistical value calculated by the feature statistical data calculation unit 307 are not limited to the moving average value. For example, the feature statistical data calculation unit 307 may calculate the Mahalanobis' generalized distances of the position data of the shape characteristic vectors, classify the position data into a plurality of groups on the basis of these Mahalanobis' generalized distances. Then, the feature statistical data calculation unit 307 may not need to use, in the subsequent processing, the shape characteristic vectors corresponding to groups other than the group including the latest position data. Furthermore, the feature statistical data calculation unit 307 may calculate a covariance value or a histogram of position data of the shape characteristic vectors. Also in this case, the temporal changes (movement) of the features can be detected by comparing the covariance values or the histograms calculated at certain time intervals.

The method of detecting the movement of a road sign, a change in the extending shape of road edges, or a change in the traffic classification of a road is not limited to the method based on the calculation of the statistical values of shape characteristic vectors as described above. Since the movement of a road sign, a change in the extension shape of road edges, or a change in the traffic classification of a road occurs due to road constructions, publicly provided construction information (for example, construction information provided by Nippon Road Traffic Information Center) may also be referred to. In this case, the shape characteristic vectors stored before the completion of the construction in the corresponding region are not used in the subsequent processing, and the shape characteristic vectors obtained after the completion of the construction in the corresponding region are used to update the shape characteristic vectors corresponding to the existing feature description data.

Furthermore, the feature statistical data calculation unit 307 may use both the statistical values of the shape characteristic vectors and publicly provided construction information to detect the movement of a road sign, a change in the extending shape of road edges, and a change in the traffic classification of a road. In this case, the feature statistical data calculation unit 307 compares the time $t_x$ at which the moving average value of the number of pieces of position data present on the line A of the shape characteristic vectors corresponding to the road sign changes with the time at which the construction is completed in the corresponding region, for example. If the difference between these times is within a predetermined value, the feature statistical data calculation unit 307 determines that the road sign has been moved at the time $t_x$.

In addition, the feature data generation system 100 may monitor movement trajectories of the vehicles 200, and may use these movement trajectories to detect the movement of a road sign, a change in the extension shape of road edges, or a change in the traffic classification of a road. For example, if the movement trajectories of the vehicles 200 change at time ty in a certain region, it is considered that there has occurred a change in the extending shape of road edges or a change in the traffic classification of a road at the time ty in the region. Therefore, the shape characteristic vectors stored before the time ty are not used in the subsequent processing. The shape characteristic vector database generation unit 306 updates the shape characteristic vectors corresponding to the existing feature description data using the shape characteristic vectors stored after the time ty. Whether the movement trajectories of the vehicles 200 have changed is determined on the basis of whether the movement trajectories have greatly changed with respect to the road line shape. For example, when the movement trajectories become no longer smooth as if they are discontinuous, it is determined that the movement trajectories of the vehicles 200 have changed.

The movement trajectories of the vehicles 200 may also changes when there is a temporary obstacle (a falling object, a fallen tree, or the like) on the road, for example. In this case, there have no occurred the movement of the road sign, a change in the extending shape of the road edges, or the change in the traffic classification of the road. It is thus preferable to use the shape characteristic vectors stored before the movement trajectories of the vehicles 200 change for updating the shape characteristic vectors. Whether the movement trajectories of the vehicles 200 have changed by a temporary obstacle is determined based on whether, after the change of the movement trajectories of the vehicles 200, the vehicles 200 return to the original movement trajectories before a predetermined time elapses. Specifically, after the change in the movement trajectories of the vehicles 200, if the vehicles 200 return to the original movement trajectories before a predetermined time elapses, it is determined that the movement trajectories of the vehicle 200 have changed due to a temporary obstacle. If the movement trajectories do not return to the original movement trajectories even after the predetermined time elapses, it is determined that the movement trajectories of the vehicles 200 have changed due to the movement of a road sign, the change in the extending shape of road edges, or the change in the traffic classification of a road.

Furthermore, the movement of a road sign, a change in the extending shape of road edges, and a change in the traffic classification of a road may also occur due to an earthquake or a sediment disaster. Therefore, the movement of a road sign, a change in the extension shape of road edges, and a change in the traffic classification of a road may be detected by using publicly provided earthquake information and disaster information in combination. In this case, the shape characteristic vectors stored before the earthquake or the sediment disaster ends in the corresponding region are not used in the subsequent processing, and the shape characteristic vectors obtained after the earthquake or the sediment disaster ends in the corresponding region are used to update the shape characteristic vectors corresponding to the existing feature description data.

The movement of a feature occurs not only by an earthquake or a sediment disaster but also by a crustal movement. Whether the cause of the movement of the feature is an earthquake, a sediment disaster, or a crustal movement is determined based on whether the position data of the shape characteristic vectors acquired from the vehicles 200 change suddenly or gradually. For example, if the position data gradually changes, it is determined that the cause of the movement of the feature is a crustal movement. In this case, as described later, the crustal movement correction unit 310 performs crustal movement correction on the position data of the shape characteristic vectors, and updates the shape characteristic vectors corresponding to the existing feature description data using all the shape characteristic vectors after the crustal movement correction.

Figure 10:
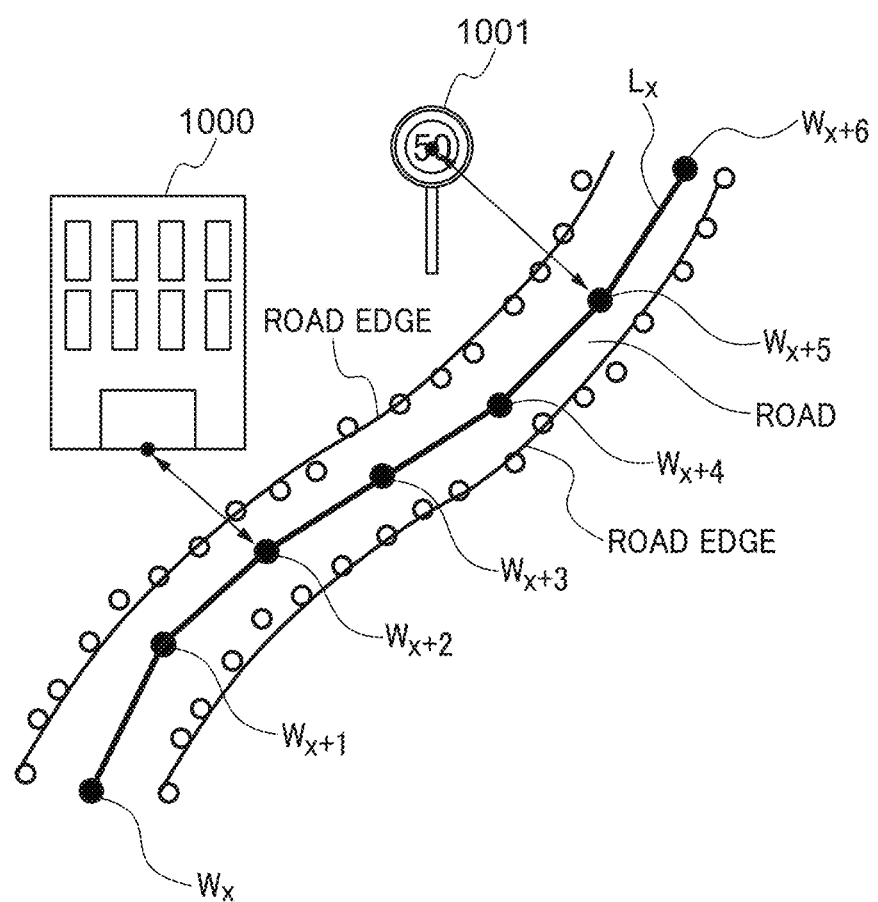
FIG. 10 is a diagram for describing assignment of a lane ID and the like by a road characteristic assignment unit.

If the shape characteristic vectors updated or generated by the shape characteristic vector database generation unit 306 correspond to road edges, the road characteristic assignment unit 308 sets the center of a pair of road edges constituting one road as a lane center line which is a virtual feature, and assigns L. (x is a natural number) as a lane ID to the lane center line as illustrated in FIG. 10.

At this time, the road characteristic assignment unit 308 sets nodes at both ends of the lane center line, connects the nodes with a transition curve, for example, a spline curve or a clothoid curve along the lane center line, and sets waypoints as dots on the transition curve at predetermined intervals, for example, every 5 m. As a waypoint ID, $W_x$ (x is a natural number) is assigned to each waypoint. Set in the lane ID and the waypoint ID are correspondences with a nearby building 1000 and a marker pole 1001 recorded in the three-dimensional high-precision map. This makes it easy to perform delivery or the like by autonomous driving.

If the road is wide, the road is partitioned into a plurality of lanes in the width direction according to the partition lines, and the lane ID is assigned to the center line of each lane. Accordingly, even if the vehicle 200 is traveling on the same road, it is possible to determine whether the vehicle is traveling on a straight lane or a right turn lane by referring to the lane ID, and it is possible to distinguish signals to follow, for example.

The road characteristic assignment unit 308 can also represent a road network constructed by a plurality of lane center lines as a topological map with reference to the lane IDs and verify the validity and consistency of road connection in the entire map.

The feature characteristic vector database generation unit 309 generates feature characteristic vectors by adding the statistical values calculated by the feature statistical data calculation unit 307, the lane IDs and the waypoint IDs assigned by the road characteristic assignment unit 308, the names of the features, and the like to the updated or generated shape characteristic vectors. FIG. 11 illustrates an example of the feature characteristic vector generated by the feature characteristic vector database generation unit 309. However, the vector elements constituting the feature characteristic vector are not limited to those in the case of FIG. 11. The feature characteristic vector database generation unit 309 also stores the generated feature characteristic vectors in the feature characteristic vector database 315.

By the way, features may move due to a crustal movement, and the movement amounts thereof may reach 10 cm to 20 cm per year, for example. Therefore, the positions of the features included in the feature characteristic vectors at the time of measurement deviate from the positions at the time of establishing the map. To cope with this, the crustal movement correction unit 310 performs crustal movement correction on current position data (positions at the time of measurement) included in the feature characteristic vectors to correct the current position data into original position data (positions at the time of map establishment), for example, position data in the Japan Geodetic System 2011 (JGD 2011) which is a geodetic reference system of the corresponding vehicles 200. This ensures the accuracy of the position data included in the feature characteristic vectors in the public coordinate system defined by the country. In particular, it is an essential condition for the feature data to ensure accuracy in the public coordinate system in a region where large crustal movements frequently occur due to large earthquakes as in Japan.

Since the feature characteristic vectors are obtained through statistical processing of a plurality of shape characteristic vectors, the information amount of the current period position data included in the feature characteristic vectors may be reduced. Therefore, the crustal movement correction unit 310 may correct the current position data included in the edge patterns to the original position data instead of the current position data included in the feature characteristic vectors. As a result, the crustal movement correction can be performed before the statistical processing. That is, since the crustal movement correction can be performed before the information amount of the position data is reduced, it is possible to obtain more accurate original position data.

In addition, the feature characteristic vectors are used as feature data for updating or generating features of the three-dimensional high-precision map by the three-dimensional high-precision map update device 400, but not all the feature characteristic vectors are reliable in the same manner. For example, a feature characteristic vector including recently acquired position data is considered to be more reliable than a feature characteristic vector including previously acquired position data, and a feature characteristic vector having a large variance of position data as a statistical value is considered to be less reliable than a feature characteristic vector having a small variance of position data.

Figure 12A:
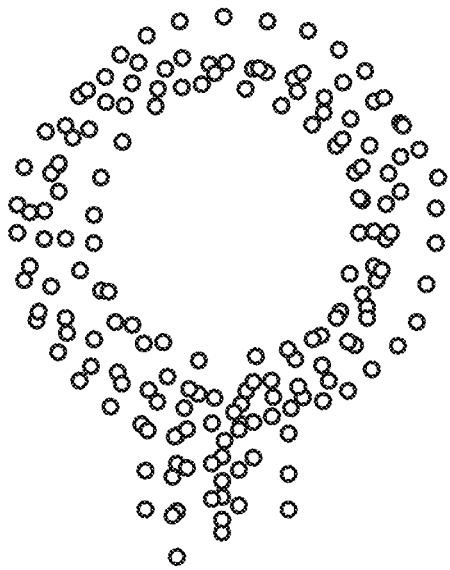
FIG. 12A is a diagram for describing generation of a quality assurance index by a quality assurance index calculation unit.

Therefore, the quality assurance index calculation unit 311 generates quality assurance indexes that are indexes representing the reliabilities of the feature characteristic vectors. For example, as illustrated in FIG. 12A, for a feature characteristic vector in which the variance of position data (see "Variance_Value" in the drawing) is a predetermined value or more and the acquisition time of the position data (see "Time_Stamp" in the drawing) is earlier than a predetermined time, a quality assurance index having a low value (see "Quality_Index" in the drawing) is generated.

Figure 12B:
FIG. 12B is a diagram for describing generation of a quality assurance index by the quality assurance index calculation unit.

On the other hand, as illustrated in FIG. 12B, for the feature characteristic vector having a small variance and a later acquisition time of the position data, a quality assurance index having a high value is generated. Then, feature characteristic vectors having a low quality assurance index are not used for updating or generating features on the three-dimensional high-precision map, or even if the feature characteristic vectors are used for updating or generating features, the features are not actively used in route search or autonomous driving. In generating the quality assurance indexes, a histogram may be used instead of the variance, and the values of the quality assurance indexes are not limited to the values illustrated in FIGS. 12A and 12B.

The timing for generating the quality assurance indexes is based on, for example, the completion of a construction in the corresponding region according to the publicly provided construction information, great changes in the statistical values of the feature characteristic vectors, changes in the movement trajectories of the vehicles 200, the end of an earthquake according to publicly provided earthquake information, and the end of a sediment disaster according to publicly provided disaster information.

In addition, the value of the quality assurance index of a feature characteristic vector is low not only in the case where the variance of the position data of the feature characteristic vector is large or the case where the acquisition time of the position data is old. For example, the value of the quality assurance index of a feature characteristic vector is also low in the case where it can be confirmed from publicly provided construction information that a predetermined time has not elapsed since construction was performed in the area where the feature exists, the case where a predetermined time has not elapsed since the movement of road signs, the change in the extending shape of the road edges, or the change in the traffic classification of the road was detected from the movement trajectories of the vehicles 200, and the case where it can be confirmed from publicly provided earthquake information or disaster information that a predetermined time has not elapsed since the end of an earthquake or a sediment disaster. If an earthquake or a sediment disaster occurs, features may move in units of several meters. Therefore, the quality assurance indexes are set to considerably low values, that is, values indicating that the features are not usable.

The position data re-measurement request unit 312 requests the scanner control unit 205 of the laser scanner unit 201 in each vehicle 200 to emit the laser light 207 again to re-scan an area in the presence of the features corresponding to the feature characteristic vectors to which the values of the quality assurance indexes are set low due to any of the various factors described above. The request for re-scan with the laser light 207 is transmitted at a timing when the values of the quality assurance indexes of the feature characteristic vectors become low, for example, and is received by the data transmission/reception unit 203. Accordingly, the feature characteristic vectors can be updated on the basis of new (re-measured) edge patterns, and the reliability of the feature characteristic vectors can be maintained. As a result, the reliability of the feature database 316 and the three-dimensional high-precision map can be improved. Since only the features corresponding to the feature characteristic vectors of which the values of the quality assurance indexes become low are re-scanned with the laser light 207, it is not necessary to re-scan with the laser light 207 the features corresponding to the feature characteristic vectors in which the values of the quality assurance indexes remain high. This eliminates the need to perform unnecessary re-scanning with the laser light 207, and makes it possible to improve the efficiency of updating the features in the feature database 316 and the three-dimensional high-precision map.

The request for re-scanning with the laser light 207 may be made, regardless of the setting of the quality assurance indexes, at the completion of a construction in the corresponding region according to the publicly provided construction information, with great changes in the statistical values of the feature characteristic vectors, with changes in the movement trajectories of the vehicles 200, at the end of an earthquake according to publicly provided earthquake information, or at the end of a sediment disaster according to publicly provided disaster information, for example.

The quality assurance indexes in the present exemplary embodiment ensure positional precision and accuracy, for example. The smaller the variance of the position data of a feature characteristic vector, the higher the positional precision.

The accuracy is higher as the amount of deviation (deviation bias amount) of the center position of a feature represented by a feature characteristic vector from a value of the center position of a true feature is smaller. The center position of the feature represented by the feature characteristic vector changes as the number of shape characteristic vectors used to derive the feature characteristic vector increases. However, as the initial value of the center position of the feature represented by the feature characteristic vector is more accurate, the quality assurance index corresponding to the accuracy is set higher.

The quality assurance indexes in the present embodiment are set as shown in Table 1 below, for example.

TABLE 1

| Accuracy | | Position precision Variance | | |
|---|---|---|---|---|
| | | Small | Medium | Large |
| Deviation amount | Small | 3 | 2 | 1 |
| | Medium | 2 | 2 | 1 |
| | Large | 1 | 1 | 1 |

The position of each vehicle 200 is acquired in real time by the self-position estimation unit 202 of the vehicle 200 using GNSS single positioning or GNSS interference positioning. Alternatively, as described above, each vehicle 200 may transmit a satellite positioning receiver signal to the feature data generation device 300, and the feature data generation device 300 may process the satellite positioning receiver signal to acquire the absolute coordinate position of the vehicle 200. In this case, since the satellite positioning receiver signals are processed later, signals used for position acquisition can be selected from among these signals. For example, the position of the vehicle 200 can be acquired after removing signals from satellites that have caused multipath. On the other hand, whether each signal has caused multipath can be determined by comparison with other signals. Therefore, in the case of acquiring the position of the vehicle 200 in real time, signals from satellites that have caused multipath cannot be removed. As a result, in a case where the feature data generation device 300 processes the satellite positioning receiver signal, the accurate position of the vehicle 200 can be acquired as compared with a case where the position of the vehicle 200 is acquired in real time. Therefore, the quality assurance index may be set high.

The quality assurance indexes of the feature characteristic vectors corresponding to features set by the method described above may be collected in a quality table for each region. The feature data generation device 300 may use this quality table to propose to a user which feature characteristic vector should be used to update or generate a feature in the corresponding region.

Figure 13:
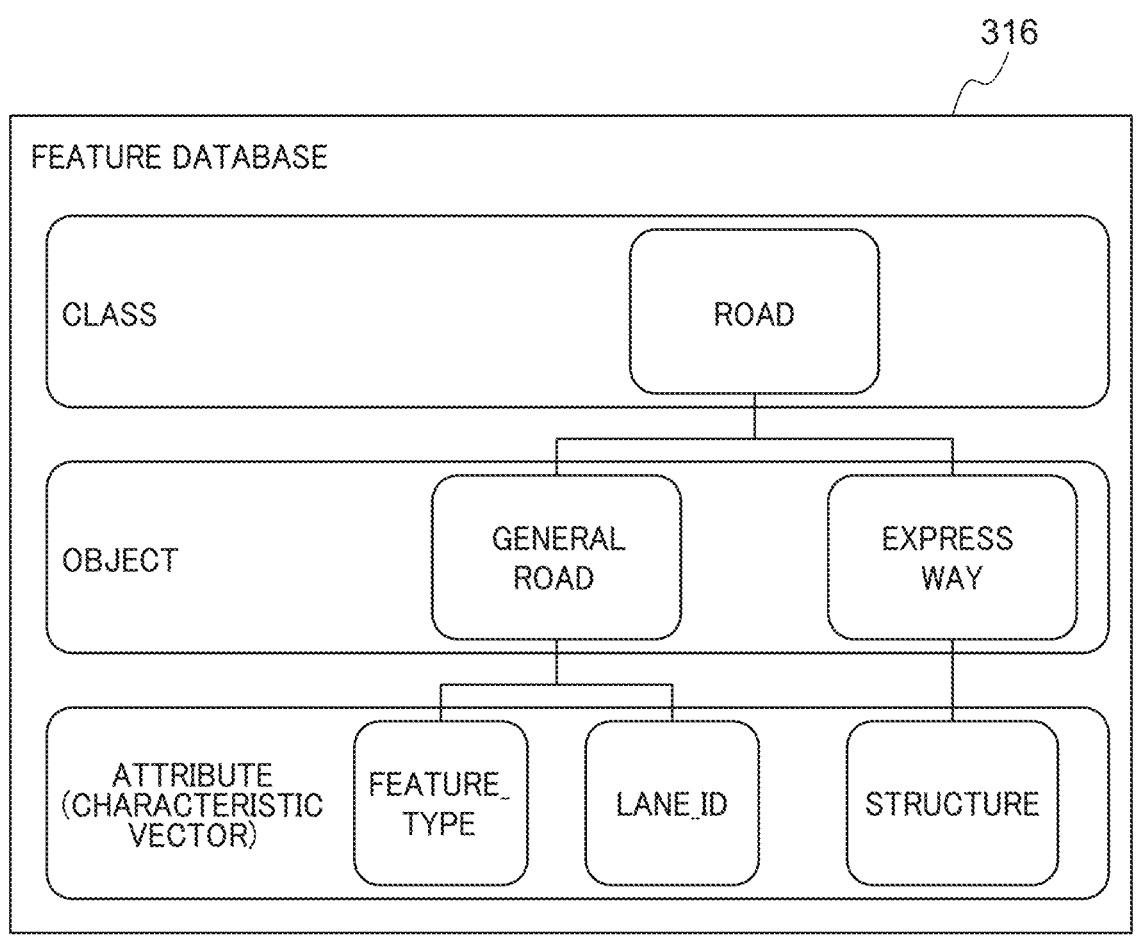
FIG. 13 is a diagram for describing a configuration of a feature database.

Thereafter, the feature characteristic vectors for which the quality assurance indexes are generated are stored in the feature database 316, and the feature database 316 is updated. FIG. 13 is a diagram for describing a configuration of the feature database 316. The feature database 316 is an object-oriented database, and stores each feature characteristic vector as an object. For example, feature characteristic vectors of "ordinary roads" and "highways" are classified into a class of "road", and vector elements of the feature characteristic vectors are managed as feature values (attributes). The feature data generation device 300 transmits the updated feature database 316 to the three-dimensional high-precision map update device 400, and the three-dimensional high-precision map update device 400 extracts a necessary feature characteristic vector from the feature database 316 with reference to the quality assurance index and updates or generates a feature of the three-dimensional high-precision map.

Figure 14:
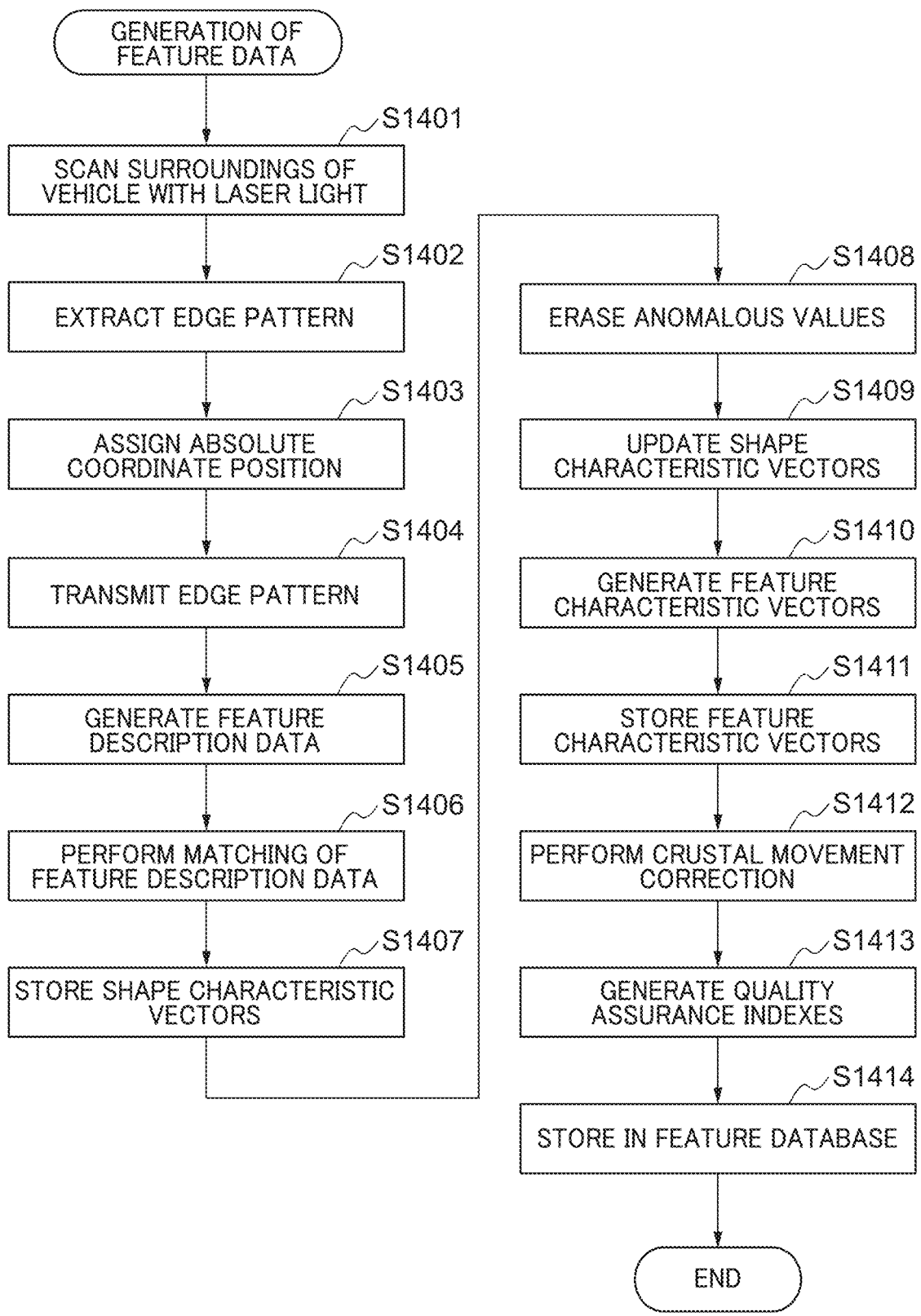
FIG. 14 is a flowchart illustrating a feature data generation method according to the present embodiment.

FIG. 14 is a flowchart illustrating a feature data generation method according to the present embodiment.

Referring to FIG. 14, first, the laser scanner unit 201 of the vehicle 200 performs scanning (scanning) of the surroundings with the laser light 207 (step S1401), and extracts the edge pattern of a target feature existing surrounding the vehicle 200 (step S1402).

Next, the self-position estimation unit 202 assigns an absolute coordinate position to each position data of the edge pattern (step S1403). For the purpose of reducing a processing load on the vehicle 200, the edge pattern may be transmitted to the feature data generation device 300 without assigning an absolute coordinate position (improvement of precision) by the self-position estimation unit 202, and the feature description data generation unit 302 may assign an absolute coordinate position to each position data of the edge pattern.

Thereafter, the data transmission/reception unit 203 transmits the edge pattern to which the absolute coordinate position is assigned to the feature data generation device 300 (step S1404). At this time, instead of step S1412 described later, the crustal movement correction unit 310 may perform crustal movement correction on the position data, to which the current absolute coordinate position is assigned, included in the edge pattern so as to correct the current position data into original position data.

Steps S1401 to S1404 may be repeatedly executed by one vehicle 200, or may be executed by a plurality of vehicles 200. As a result, the edge patterns of a plurality of target features are transmitted to the feature data generation device 300.

Next, the feature description data generation unit 302 generates feature description data of the target feature (step S1405), and the feature characteristic data generation unit 303 performs matching between the existing feature description data and the new feature description data (step S1406), and stores the shape characteristic vector in the shape characteristic vector database 314 on the basis of the result of the matching (step S1407).

Thereafter, the anomalous measurement value detection unit 304 removes an anomalous value from the shape characteristic vector stored in the shape characteristic vector database 314 (step S1408), and the shape characteristic vector database generation unit 306 updates the shape characteristic vector corresponding to the existing feature description data through statistical processing of a plurality of updating shape characteristic vectors (step S1409).

Next, the feature characteristic vector database generation unit 309 generates a feature characteristic vector on the basis of the updated shape characteristic vector (step S1410), and stores the feature characteristic vector in the feature characteristic vector database 315 (step S1411). Thereafter, the crustal movement correction unit 310 applies crustal movement correction of the current period position data included in the stored feature characteristic vector to the original period position data (step S1412). When the crustal movement correction is performed immediately after step S1403, step S1412 is skipped.

Next, the quality assurance index calculation unit 311 generates quality assurance indexes of the feature characteristic vectors (step S1413), the feature characteristic vectors are stored in the feature database 316 (step S1414), and the feature database 316 is updated and the processing is terminated.

According to the present embodiment, an edge pattern is extracted from a large number of pieces of position data surrounding the vehicle 200 obtained by scanning with the laser light 207, and feature characteristic vectors used for updating or generating features on a three-dimensional high-precision map are generated as feature data through statistical processing and the like on the position data of the edge pattern. That is, as compared with a case where the feature characteristic vectors are generated directly from a large number of pieces of position data surrounding the vehicle 200, it is possible to greatly reduce time and effort, and thus, it is possible to repeatedly generate the feature characteristic vectors. Accordingly, the update of the feature database 316 can be repeatedly executed. As a result, the error in the feature database 316 is corrected, and the accuracy of the feature database 316 can be secured. Since the three-dimensional high-precision map is updated or generated using the feature characteristic vectors of the updated feature database 316, the features on the three-dimensional high-precision map are maintained in the latest state, so that the accuracy of the three-dimensional high-precision map can be secured.

In the present embodiment, since a feature characteristic vector used for updating the feature database 316 is generated through statistical processing on a plurality of shape characteristic vectors, it is possible to statistically justify the feature generated or update on the three-dimensional high-precision map using the feature characteristic vector.

Although the preferred embodiments of the present invention have been described above, the present invention is not limited to the above-described embodiments, and various variations and changes can be made within the scope of the gist of the present invention.

The present application claims priority based on Japanese Patent Application No. 2020-131816 filed on Aug. 3, 2020, the entire contents of which are incorporated herein by reference.

REFERENCE SIGNS LIST

100 Feature data generation system
200 Vehicle
300 Feature data generation device
301 SD map
302 Feature description data generation unit
303 Feature characteristic data generation unit
304 Anomalous measurement value detection unit
306 Shape characteristic vector database generation unit
307 Feature statistical data calculation unit
309 Feature characteristic vector database generation unit
310 Crustal movement correction unit
311 Quality assurance index calculation unit
312 Position data re-measurement request unit 313 Feature database generation unit
314 Shape characteristic vector database
315 Feature characteristic vector database
316 Feature database

The invention claimed is:

1. A feature data generation method comprising:
an edge pattern extraction step of extracting an edge pattern indicating a boundary of a target feature existing around a moving body from position data of a large number of measurement points around the moving body measured using a LIDAR technology to reduce the amount of information;
a terrestrial reference frame position assignment step of assigning positions in a terrestrial reference frame to the extracted edge pattern;
a feature data generation step of generating feature data representing a feature from the edge pattern to which the positions in the terrestrial reference frame are assigned;
a shape characteristic vector setting step of, if an aggregate of the position data in the edge pattern to which the positions in the terrestrial reference frame are assigned matches data prepared in advance for describing an existing feature at a predetermined ratio or more, setting the aggregate of the position data as a shape characteristic vector to be used for generating or updating the feature data;
a shape characteristic vector acquiring step of acquiring a plurality of the shape characteristic vectors from position data of surroundings of a plurality of the moving bodies, through the extraction of the edge pattern, the assignment of the positions in the terrestrial reference frame to the edge pattern, and the setting of the shape characteristic vector; and
a feature characteristic vector generating step of performing statistical processing on the plurality of shape characteristic vectors to generate a feature characteristic vector for generating or updating the feature data.

2. The feature data generation method according to claim 1, further comprising a removing step of detecting and removing an anomalous measurement value from the shape characteristic vector on the basis of a Mahalanobis' generalized distance.

3. The feature data generation method according to claim 1, further comprising a determining step of calculating at least one statistical value in the shape characteristic vector and determining whether the shape characteristic vector includes a temporal change on the basis of the calculated statistical value.

4. The feature data generation method according to claim 1, further comprising a crustal movement correction step of performing crustal movement correction on the feature characteristic vector in order to adjust position information included in the feature characteristic vector to a geodetic reference system of a region where the moving bodies exist.

5. The feature data generation method according to claim 1, further comprising a crustal movement correction step of performing crustal movement correction in advance on the edge pattern to which the positions in the terrestrial reference frame are assigned in order to adjust position information included in the feature characteristic vector to a geodetic reference system of a region where the moving bodies exists.

6. The feature data generation method according to claim 1, further comprising an index calculation step of calculating an index for quality assurance of the feature characteristic vector on the basis of at least one of a time when the feature characteristic vector was generated and a statistical value of the feature characteristic vector.

7. The feature data generation method according to claim 6, further comprising a position data re-measurement request step of requesting re-measurement of position data by the LIDAR technology in an area corresponding to the feature characteristic vector on the basis of the index for quality assurance.

8. The feature data generation method according to claim 1, further comprising a position data measurement step of measuring a large number of pieces of position data intensively in an area corresponding to a feature included in a standard accuracy map using the LIDAR technology.

9. The feature data generation method according to claim 1, further comprising a position data measurement step of measuring a large number of pieces of position data intensively in an area corresponding to a feature recognized by the image data of surroundings of the moving body using the LIDAR technology.

10. The feature data generation method according to claim 8, wherein the large number of pieces of position data are obtained by a LIDAR scanner having a laser scanner to which a laser light irradiation direction varying technology is applied in the position data measurement step.

11. The feature data generation method according to claim 1, further comprising an edge pattern extraction step of extracting the edge pattern on the basis of the image data of surroundings of the moving body obtained by imaging, from the position data of the large number of measurement points around the moving body measured using the LIDAR technology.

12. A feature data generation method comprising:
an edge pattern extraction step of extracting an edge pattern indicating a boundary of a target feature existing around a moving body from position data of a large number of measurement points around the moving body measured using a LIDAR technology to reduce the amount of information;
a terrestrial reference frame position assignment step of assigning positions in a terrestrial reference frame to the extracted edge pattern;
a feature data generation step of generating feature data representing a feature from the edge pattern to which the positions in the terrestrial reference frame are assigned;
a shape characteristic vector setting step of, if an aggregate of the position data in the edge pattern to which the positions in the terrestrial reference frame are assigned matches data prepared in advance for describing an existing feature at a predetermined ratio or more, setting the aggregate of the position data as a shape characteristic vector to be used for generating or updating the feature data;
a shape characteristic vector acquiring step of acquiring a plurality of the shape characteristic vectors by repeating the extraction of the edge pattern, the assignment of the positions in the terrestrial reference frame to the edge pattern, and the setting of the shape characteristic vector; and
a feature characteristic vector generating step of performing statistical processing on the plurality of shape characteristic vectors to generate a feature characteristic vector for generating or updating the feature data.

* * * * *